United States Patent
Mohammed et al.

(10) Patent No.: US 12,485,880 B2
(45) Date of Patent: *Dec. 2, 2025

(54) SMART PARKING RECOMMENDATION SYSTEM FOR ENERGY CONSERVATION

(71) Applicant: GM Global Technology Operations LLC, Detroit, MI (US)

(72) Inventors: Abbas Mohammed, Whitby (CA); Alaa M. Khamis, Courtice (CA); Dhruv Patel, Oshawa (CA); Joseph F. Szczerba, Grand Blanc, MI (US); Mutaz Keldani, Oshawa (CA); Karl Bo Albert Mikkelsen, Peachland (CA); Paul E. Krajewski, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 170 days.

This patent is subject to a terminal disclaimer.

(21) Appl. No.: 18/420,181

(22) Filed: Jan. 23, 2024

(65) Prior Publication Data

US 2025/0236283 A1 Jul. 24, 2025

(51) Int. Cl.
*B60W 30/06* (2006.01)
*B60W 50/14* (2020.01)
*G08G 1/14* (2006.01)

(52) U.S. Cl.
CPC .......... *B60W 30/06* (2013.01); *B60W 50/14* (2013.01); *G08G 1/143* (2013.01); *G08G 1/145* (2013.01);

(Continued)

(58) Field of Classification Search
CPC ....... B60W 2050/146; B60W 2556/10; B60W 2556/35; B60W 2556/40; B60W 2556/50
See application file for complete search history.

(56) References Cited

U.S. PATENT DOCUMENTS 11,897,509 B2 * 2/2024 Lohmeyer ......... B60W 60/0015
2024/0416940 A1 * 12/2024 Kumar .................. B60W 40/08

FOREIGN PATENT DOCUMENTS

DE 102016011068 A1 4/2017
DE 102017204271 A1 9/2018

(Continued)

*Primary Examiner* — Brian A Zimmerman
*Assistant Examiner* — Cal J Eustaquio
(74) *Attorney, Agent, or Firm* — Vivacqua Crane, PLLC (57) ABSTRACT

A smart parking recommendation system for energy conservation in a vehicle includes a smart parking recommendation application (SPRA) that determines that enabling conditions have been met and obtains from sensors and actuators of the vehicle, information about the vehicle and the vehicle's environment. The SPRA monitors information from the sensors and actuators and obtained from remote computing resources, a vehicle operator's current vehicle usage and determines a typical parking duration for a current parking location, and categorizes the current parking location. The SPRA utilizes an artificial intelligence (AI) or machine learning (ML) model to suggest a parking spot within the parking location that satisfies user and energy consumption passenger compartment thermal quality preferences. The SPRA selectively parks or guides the vehicle to be parked within a parking spot that satisfies the constraints and preferences, and minimizes energy consumption for maintaining passenger compartment and battery thermal qualities.

20 Claims, 5 Drawing Sheets

(52) U.S. Cl.
CPC ... *B60W 2050/146* (2013.01); *B60W 2556/10* (2020.02); *B60W 2556/35* (2020.02); *B60W 2556/40* (2020.02); *B60W 2556/50* (2020.02)

(56) References Cited

FOREIGN PATENT DOCUMENTS

| | | |
|---|---|---|
| DE | 102017123227 A1 | 4/2019 |
| DE | 102021002223 A1 | 6/2021 |
| DE | 102023004728 A1 | 1/2024 |
| DE | 102023124313 A1 | 3/2024 |

\* cited by examiner

SMART PARKING RECOMMENDATION SYSTEM FOR ENERGY CONSERVATION

INTRODUCTION

The present disclosure relates to systems and methods for managing thermal quality of vehicle passenger compartments, and more specifically to systems and methods for reducing thermal load on such vehicle passenger compartments. Managing thermal characteristics of vehicle passenger compartments can consume significant quantities of energy from on-board vehicle energy sources in both electric vehicles (EVs), traditional internal combustion engine (ICE) vehicles, and hybrid electric vehicles (HEVs) of all sorts. Accordingly, such passenger compartment thermal management can significantly impact vehicle range and overall efficiency. Traditional systems and methods of managing thermal quality of vehicle passenger compartments often utilize means that efficiently utilize certain heating, ventilation and air-conditioning (HVAC) system components, and other vehicle components as heat sinks and heat sources.

However, while current systems and methods for managing thermal quality of vehicle passenger compartments achieve their intended purpose, there is a need for new and improved systems and methods of managing vehicle passenger compartment thermal quality that utilize preexisting hardware and systems to effectively take advantage of the vehicle's surroundings to more efficiently achieve passenger compartment thermal characteristics while maintaining or improving vehicle range.

SUMMARY

According to several aspects of the present disclosure, a smart parking recommendation system for energy conservation in a vehicle includes a vehicle, one or more sensors equipped to the vehicle and collecting static and dynamic information about the vehicle, and an environment surrounding the vehicle. The system further includes one or more actuators disposed on the vehicle and actively and continuously adjusting the state of the vehicle. The system further includes a controller with a processor, a memory, and one or more input/output (I/O) ports. The I/O ports communicate with the one or more sensors and the one or more actuators. The processor executes programmatic control logic stored in the memory. The programmatic control logic includes a smart parking recommendation application (SPRA). The SPRA application includes at least first, second, third, fourth, fifth, sixth, and seventh control logic portions. The first control logic determines that one or more enabling conditions have been met. The second control logic obtains from the one or more sensors and from the one or more actuators, static and dynamic information about the vehicle and the environment surrounding the vehicle. The third control logic monitors, via the one or more sensors, and from information obtained from remote computing resources via the I/O ports, a vehicle operator's current usage of the vehicle and determines a typical parking duration for a current parking location. The fourth control logic categorizes the current parking location. The fifth control logic utilizes an artificial intelligence (AI) or machine learning (ML) model to suggest a parking spot within the current parking location that satisfies vehicle passenger compartment thermal quality user preferences and energy consumption preferences given a set of soft constraints and hard constraints. The sixth control logic displays parking spot options to the vehicle operator via a human-machine interface (HMI). The seventh control logic selectively parks or guides the vehicle to be parked within a parking spot that satisfies the soft constraints, the hard constraints, the vehicle passenger compartment thermal quality user preferences, and minimizes energy consumption for maintaining thermal qualities of the vehicle passenger compartment, and thermal qualities of vehicle batteries.

In another aspect of the present disclosure the first control logic further includes control logic for automatically engaging the SPRA by default; or control logic for receiving, from the vehicle operator via the HMI, an input that causes the SPRA to manually engage; and upon automatically engaging the SPRA or receiving a vehicle operator input that causes the SPRA to manually engage, determining that the enabling conditions have been met and enabling the SPRA.

In yet another aspect of the present disclosure the third control logic further includes control logic that monitors, via the one or more sensors and the one or more actuators of the vehicle, vehicle static and dynamic information and information about the environment surrounding the vehicle. The third control logic also obtains, from the remote computing resources, current and historical information about the environment surrounding the vehicle, and information about known parking locations relevant to the vehicle.

In yet another aspect of the present disclosure the fourth control logic further includes control logic that determines known parking durations at each location to which the vehicle is driven; and control logic that categorizes the current parking location according to known historical parking durations at the current parking location by the vehicle and the vehicle operator.

In yet another aspect of the present disclosure the fourth control logic further includes control logic that obtains, from the remote computing resources, known parking location information including: a quantity of parking spots within the known parking location; shade information based on time-of-day, season, weather information, geographical location, and parking spot availability. The fourth control logic further determines a current physical location of the vehicle within the current parking location is available and satisfies vehicle passenger compartment thermal quality user preferences and energy consumption preferences given a set of soft constraints and hard constraints. The soft constraints include: vehicle operator preferences, a vehicle operator preferred parking location, a vehicle operator preferred parking safety score, a crowd-sourced parking location score, a street parking fine score, and vehicle operator familiarity with the current parking location. The hard constraints include vehicle proximity to destination, vehicle physical size compared to parking lot physical constraints, duration of parking allowed at the parking location, vehicle operator accessibility needs, a parking fee, and a parking hourly rate.

In yet another aspect of the present disclosure the fifth control logic further includes control logic that determines whether a parking map for the current parking location exists; and upon determining that a parking map does not exist, executing control logic that prompts the vehicle operator or prompts the vehicle to tour the current parking location and utilize the sensors and actuators to scan the current parking location and combine global positioning system (GPS) information obtained via communications through the I/O ports to develop a new parking map for the current parking location.

In yet another aspect of the present disclosure the fifth control logic further includes control logic that, upon determining that a parking map does exist, or that a new parking map exists, utilizes one or more of AI and ML models to determine which parking spots of a plurality of parking spots within the parking map or new parking map satisfy vehicle passenger compartment thermal preferences and energy consumption preferences, given the soft constraints and the hard constraints.

In yet another aspect of the present disclosure the fifth control logic further includes control logic that generates a thermal comfort prediction for each of the parking spots that satisfy vehicle passenger compartment thermal preferences and energy consumption preferences, given the soft constraints and the hard constraints; and control logic that ranks the parking spots based on the thermal comfort prediction and the energy consumption preferences.

In yet another aspect of the present disclosure the sixth control logic further includes control logic that presents to the vehicle operator, via the HMI, a ranked list of recommended parking spots based on the thermal comfort prediction and the energy consumption preferences for each of the parking spots that satisfy the vehicle passenger compartment thermal preferences and energy consumption preferences, given the soft constraints and the hard constraints.

In yet another aspect of the present disclosure the seventh control logic further includes control logic that causes one or more of the vehicle and the vehicle operator to select one of the recommended parking spots, and guiding the vehicle operator to park the vehicle within the selected one of the recommended parking spots or guiding the vehicle to drive automatically to park within the selected one of the recommended parking spots.

In yet another aspect of the present disclosure the seventh control logic further includes control logic that decreases energy consumption of the vehicle from a first level to a second level less than the first level by utilizing vehicle position within the parking location to optimize a solar exposure profile and a wind exposure profile to reduce reliance upon a vehicle heating, ventilation and air conditioning (HVAC) system to maintain the thermal qualities of the vehicle passenger compartment and vehicle batteries.

In yet another aspect of the present disclosure a smart parking recommendation method for energy conservation in a vehicle includes collecting, with a plurality of sensors disposed on a vehicle, real-time information about a dynamic state of the vehicle and an environment surrounding the vehicle. The method further includes actively and continuously adjusting a dynamic state of the vehicle with a plurality of actuators disposed on the vehicle, and executing programmatic control logic including a smart parking recommendation application (SPRA) stored in memory of a controller of the vehicle. The controller has a processor, a memory, and one or more input/output (I/O) ports, the I/O ports communicating with the plurality of sensors and the plurality of actuators. The SPRA application includes control logic for: determining that one or more enabling conditions have been met, obtaining from the plurality of sensors and from the plurality of actuators, static and dynamic information about the vehicle and the environment surrounding the vehicle, and for monitoring, via the plurality of sensors, and from information obtained from remote computing resources via the I/O ports, a vehicle operator's current usage of the vehicle and determines a typical parking duration for a current parking location. The SPRA application further includes control logic for categorizing the current parking location; utilizing an artificial intelligence (AI) or machine learning (ML) model to suggest a parking spot within the current parking location that satisfies vehicle passenger compartment thermal quality user preferences and energy consumption preferences given a set of soft constraints and hard constraints; and displaying parking spot options to the vehicle operator via a human-machine interface (HMI). The SPRA application further includes control logic for selectively parking or guiding the vehicle to be parked within a parking spot that satisfies the soft constraints, the hard constraints, the vehicle passenger compartment thermal quality user preferences, and decreasing energy consumption of the vehicle from a first level to a second level less than the first level by utilizing vehicle position within the parking location to optimize a solar exposure profile and a wind exposure profile to reduce reliance upon a vehicle heating, ventilation and air conditioning (HVAC) system to maintain the thermal qualities of the vehicle passenger compartment and vehicle batteries.

In yet another aspect of the present disclosure the method further includes automatically engaging the SPRA by default; or receiving, from the vehicle operator via the HMI, an input that causes the SPRA to manually engage; and engaging the SPRA or receiving a vehicle operator input that causes the SPRA to manually engage, determining that the enabling conditions have been met and enabling the SPRA.

In yet another aspect of the present disclosure the method further includes monitoring, via the plurality of sensors and the plurality of actuators of the vehicle, vehicle static and dynamic information and information about the environment surrounding the vehicle; and obtaining, from the remote computing resources, current and historical information about the environment surrounding the vehicle, and information about known parking locations relevant to the vehicle.

In yet another aspect of the present disclosure the method further includes determining known parking durations at each location to which the vehicle is driven; and categorizing the current parking location according to known historical parking durations at the current location by the vehicle and the vehicle operator.

In yet another aspect of the present disclosure the method further includes obtaining, from the remote computing resources, known parking location information including: a quantity of parking spots within the known parking location; shade information based on time-of-day, season, weather information, geographical location, and parking spot availability. The method further includes determining a current physical location of the vehicle within the current parking location is available and satisfies vehicle passenger compartment thermal quality user preferences and energy consumption preferences given a set of soft constraints and hard constraints. The soft constraints include vehicle operator preferences, a vehicle operator preferred parking location, a vehicle operator preferred parking safety score, a crowd-sourced parking location score, a street parking fine score, and vehicle operator familiarity with the current parking location. The hard constraints include vehicle proximity to destination, vehicle physical size compared to parking lot physical constraints, duration of parking allowed at the parking location, vehicle operator accessibility needs, a parking fee, and a parking hourly rate. The method further includes determining whether a parking map for the current parking location exists; and upon determining that a parking map does not exist, executing control logic that prompts the vehicle operator or prompts the vehicle to tour the current parking location and utilize the sensors and actuators to scan the current parking location and combine global positioning system (GPS) information obtained via communications through the I/O ports to develop a new parking map for the current parking location.

In yet another aspect of the present disclosure the method further includes upon determining that a parking map does exist, or that a new parking map exists, utilizes one or more of AI and ML models to determine which parking spots of a plurality of parking spots within the parking map or new parking map satisfy vehicle passenger compartment thermal preferences and energy consumption preferences, given the soft constraints and the hard constraints.

In yet another aspect of the present disclosure the method further includes generating a thermal comfort prediction for each of the parking spots that satisfy vehicle passenger compartment thermal preferences and energy consumption preferences, given the soft constraints and the hard constraints, and ranking the parking spots based on the thermal comfort prediction and the energy consumption preferences. The method further includes presenting to the vehicle operator, via the HMI, a ranked list of recommended parking spots based on the thermal comfort prediction and the energy consumption preferences for each of the parking spots that satisfy the vehicle passenger compartment thermal preferences and energy consumption preferences, given the soft constraints and the hard constraints.

In yet another aspect of the present disclosure the method further includes causing one or more of the vehicle and the vehicle operator to select one of the recommended parking spots, and guiding the vehicle operator to park the vehicle within the selected one of the recommended parking spots or guiding the vehicle to drive automatically to park within the selected one of the recommended parking spots.

In yet another aspect of the present disclosure the method further includes a smart parking recommendation method for energy conservation in a vehicle includes collecting, with one or more sensors disposed on a vehicle, real-time information about a dynamic state of the vehicle and an environment surrounding the vehicle, and actively and continuously adjusting a dynamic state of the vehicle with one or more actuators disposed on the vehicle. The method further includes executing programmatic control logic including a smart parking recommendation application (SPRA) stored in memory of a controller of the vehicle, the controller having a processor, a memory, and one or more input/output (I/O) ports, the I/O ports communicating with the one or more sensors and the one or more actuators. The SPRA application includes control logic for: automatically engaging the SPRA by default, or receiving, from a vehicle operator via a human-machine interface (HMI), an input that causes the SPRA application to manually engage, engaging the SPRA application or receiving a vehicle operator input that causes the SPRA application to manually engage, determining that enabling conditions have been met and enabling the SPRA application, and obtaining from the one or more sensors and from the one or more actuators, static and dynamic information about the vehicle and the environment surrounding the vehicle. The SPRA application further includes control logic for monitoring, via the one or more sensors, and from information obtained from remote computing resources via the I/O ports, a vehicle operator's current usage of the vehicle and obtaining, from the remote computing resources, current and historical information about the environment surrounding the vehicle, and information about known parking locations relevant to the vehicle; and determining a typical parking duration for a current parking location. The SPRA application further includes control logic for determining known parking durations at each location to which the vehicle is driven, and for categorizing the current parking location according to known historical parking durations at the current location by the vehicle and the vehicle operator. The SPRA application further includes control logic for obtaining, from the remote computing resources, known parking location information including: a quantity of parking spots within the known parking location; shade information based on time-of-day, season, weather information, geographical location, and parking spot availability. The SPRA application further includes control logic for determining a current physical location of the vehicle within the current parking location is available and satisfies vehicle passenger compartment thermal quality user preferences and energy consumption preferences given a set of soft constraints and hard constraints. The soft constraints include vehicle operator preferences, a vehicle operator preferred parking location, a vehicle operator preferred parking safety score, a crowd-sourced parking location score, a street parking fine score, and vehicle operator familiarity with the current parking location. The hard constraints include vehicle proximity to destination, vehicle physical size compared to parking lot physical constraints, duration of parking allowed at the parking location, vehicle operator accessibility needs, a parking fee, and a parking hourly rate. The SPRA application further includes control logic for determining whether a parking map for the current parking location exists; and upon determining that a parking map does not exist, executing control logic that prompts the vehicle operator or prompts the vehicle to tour the current parking location and utilize the one or more sensors and the one or more actuators to scan the current parking location and combine global positioning system (GPS) information obtained via communications through the I/O ports to develop a new parking map for the current parking location. The SPRA application further includes control logic that, upon determining that a parking map does exist, or that a new parking map exists, utilizes one or more of AI and ML models to determine which parking spots of a plurality of parking spots within the parking map or new parking map satisfy vehicle passenger compartment thermal preferences and energy consumption preferences, given the soft constraints and the hard constraints. The SPRA application further includes control logic for utilizing an artificial intelligence (AI) or machine learning (ML) model to suggest a parking spot within the current parking location that satisfies vehicle passenger compartment thermal quality user preferences and energy consumption preferences given a set of soft constraints and hard constraints, including: generating a thermal comfort prediction for each of the parking spots that satisfy vehicle passenger compartment thermal preferences and energy consumption preferences, given the soft constraints and the hard constraints. The SPRA application further includes control logic for ranking the parking spots based on the thermal comfort prediction and the energy consumption preferences. The SPRA application further includes control logic for presenting to the vehicle operator, via the HMI, a ranked list of recommended parking spots based on the thermal comfort prediction and the energy consumption preferences for each of the parking spots that satisfy the vehicle passenger compartment thermal preferences and energy consumption preferences, given the soft constraints and the hard constraints. The SPRA application further includes control logic for causing one or more of the vehicle and the vehicle operator to select one of the recommended parking spots, and selectively parking or guiding the vehicle to be parked within a parking spot that satisfies the soft constraints, the hard constraints, the vehicle passenger compartment thermal quality user preferences, and decreasing energy consumption of the vehicle from a first level to a second level less than the first level by utilizing vehicle position within the parking location to optimize a solar exposure profile and a wind exposure profile to reduce reliance upon a vehicle heating, ventilation and air conditioning (HVAC) system to maintain the thermal qualities of the vehicle passenger compartment and vehicle batteries.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
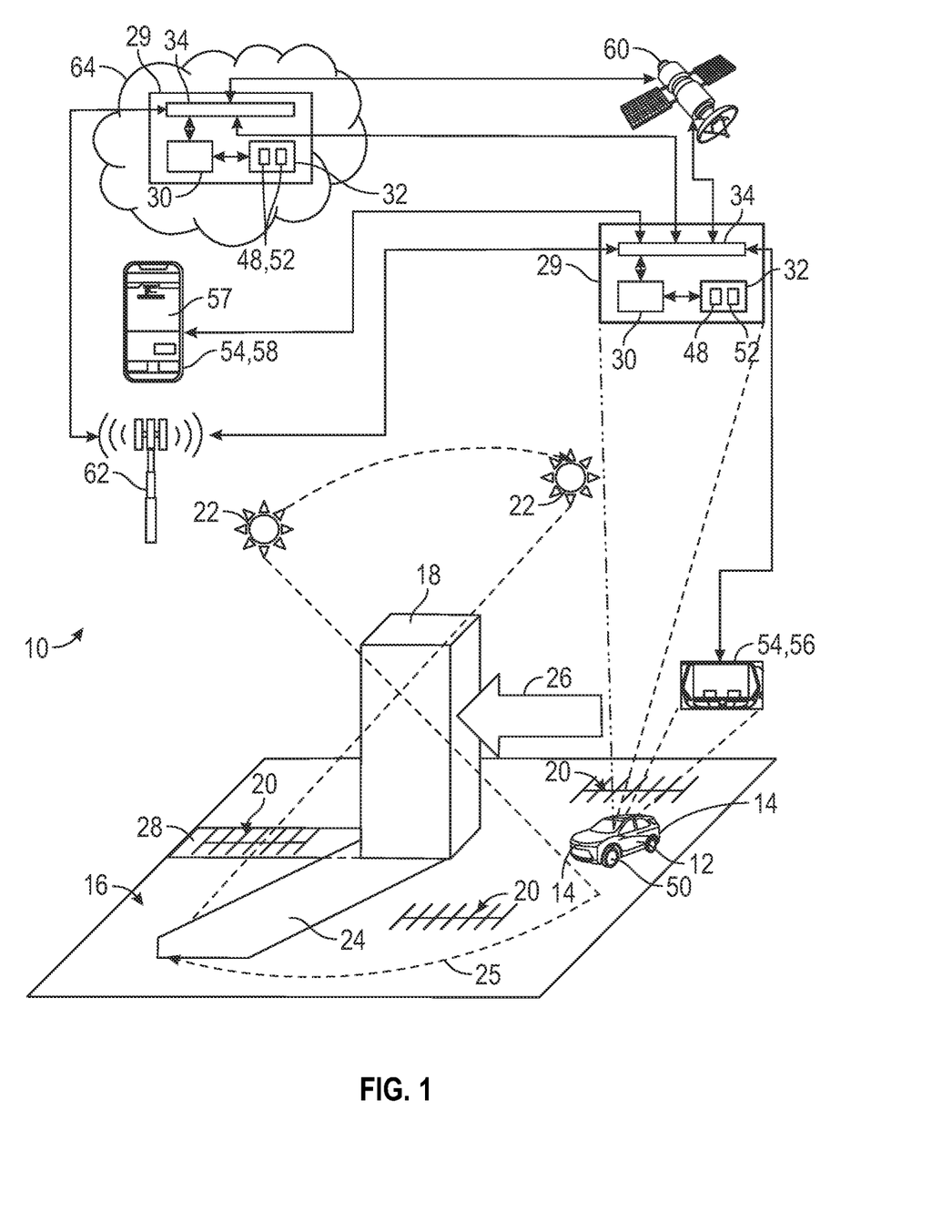
FIG. 1 is a schematic diagram of a smart parking recommendation system for energy conservation according to an exemplary embodiment.
Figure 2:
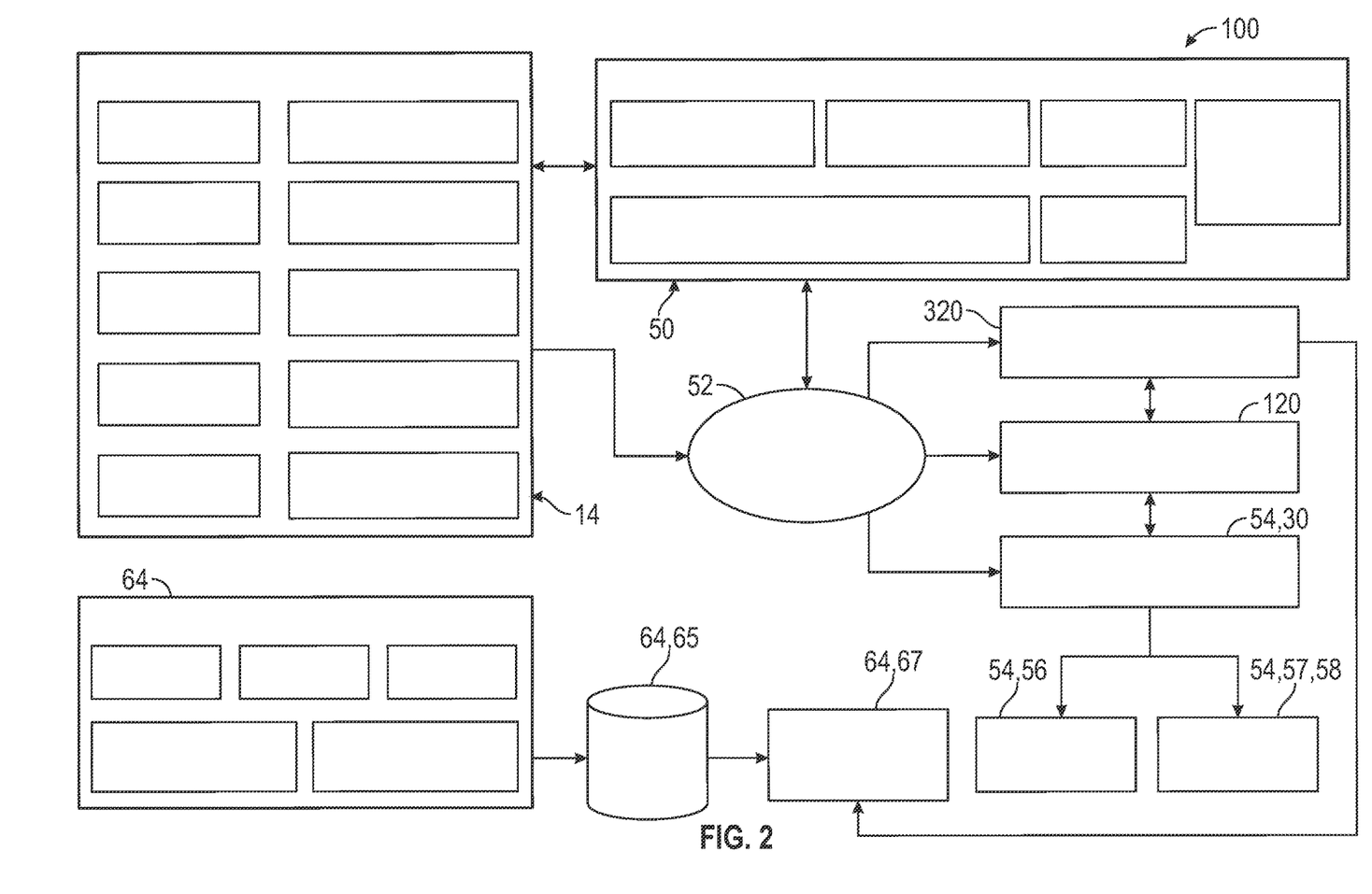
FIG. 2 is a component diagram of a portion of the smart parking recommendation system for energy conservation of FIG. 1 according to an exemplary embodiment.

Referring to FIGS. 1 and 2, a smart parking recommendation system 10 for energy conservation in vehicles 12 is shown. The system 10 includes at least one vehicle 12. While the vehicle 12 is shown as a passenger car, it should be appreciated that the vehicle 12 may be a van, bus, tractor-trailer, semi, SUV, truck, bicycle, e-bike, tricycle, motorcycle, airplane, helicopter, amphibious vehicle, or any other such vehicle without departing from the scope or intent or the present disclosure. The vehicle 12 is equipped with one or more sensors 14. The sensors 14 may include any of a wide variety of vehicle 12 and environmental sensors 14 such as cameras, radars, ambient air temperature sensors, passenger compartment temperature sensors, vehicle seat occupancy sensors, front windshield temperature sensors, rain sensors, window position sensors, sunroof or moonroof position sensors, and the like. In several aspects, the sensors 14 measure and/or detect static and dynamic information about the vehicle 12, as well as information about the location, position, attitude, altitude, and environment surrounding the vehicle 12.

In several aspects, the vehicle 12 of FIG. 1 is shown at a parking location 16 having a building 18 and a plurality of parking spots 20. The sun 22 is incident upon the building 18 and causes the building 18 to cast a shadow or shade 24 that moves along a sun shadow path 25 during the course of a day as the sun 22 changes position relative to the building 18 and the parking location 16. In further aspects, wind 26 may blow against the building 18 and a wind shadow 28 may result behind the building 18, relative to the direction of the wind 26 where the wind 26 is incident upon the building 18.

The vehicle 12 is further equipped with one or more controllers 29. Each of the controllers 29 is a non-generalized electronic control device having a preprogrammed digital computer or processor 30, non-transitory computer readable medium or memory 32 used to store data such as control logic software applications, instructions, computer code, data, lookup tables, and the like, and one or more input/output (I/O) ports 34. Computer readable medium or memory 32 includes any type of medium capable of being accessed by a computer, such as read-only memory (ROM), random-access memory (RAM), a hard disk drive, solid-state memory, a compact disc (CD), digital video disc (DVD), or any other type of memory 32. A non-transitory computer readable medium or memory excludes wired, wireless, optical, or other communication links that transport transitory electrical or other signals. A non-transitory computer readable medium or memory 32 includes media where data can be permanently stored and media where data can be stored and later overwritten, such as a rewritable optical disc or an erasable memory device.

Computer code includes any type of program code, including source code, object code, and executable code. The processor 30 is configured to execute the code or instructions. The vehicle may have controllers 29 including a dedicated Wi-Fi controller, an engine-control module, a transmission control module, a brake control module, an infotainment control module, a heating, ventilation and air-conditioning (HVAC) control module 36, thermal energy management control modules 38, advanced driver assistance system (ADAS) control modules 40, power mode control modules 42, ambient air humidity models and/or modules 44, vehicle operator 45 usage and vehicle 12 idle profiles 46, and the like.

The controller 29 further includes one or more applications 48. An application 48 is a software program configured to perform a specific function or set of functions. The application 48 may include one or more computer programs, software components, sets of instructions, procedures, functions, objects, classes, instances, related data, or a portion thereof adapted for implementation in a suitable computer readable program code. The applications 48 may be stored within the memory 32 or in additional or separate memory 32. In several aspects, applications 48 may manage on-board control system functions, including actuators 50 of such as powertrain systems, suspension systems, brake systems, steering systems, body control systems, and the like in an exemplary vehicle 12. The actuators 50 alter one or more of a static and/or dynamic state of the vehicle 12. In several aspects, the applications 48 include a smart parking recommendation application (SPRA) 52 that may be used to improve vehicle 12 passenger compartment thermal performance, as well as vehicle 12 driving range and energy efficiency.

The controller 29 is in electronic communication with one or more human-machine interfaces (HMIs) 54, such as a heads-up display (not specifically shown), an infotainment system 56 disposed within the vehicle 12, a vehicle operator's 45 handheld device such as within a mobile application or mobile app 57 accessed and displayed on a cellular phone 58, tablet computing device, or the like. Information about the various on-board systems may be displayed or otherwise relayed to the vehicle operator 45 via visual, audible, and/or tactile outputs to the one or more HMIs 54.

In further aspects, the system 10 obtains data regarding the position, location, altitude, attitude, weather conditions, and other aspects of the environment surrounding the vehicle 12 from a variety of off-board sources, including but not limited to: satellites 60 such as global positioning system (GPS) satellites, weather satellites, communications s satellites; and infrastructure such as cellular towers 62 and remote computing resources such as cloud-based computing devices 64, and the like. In several aspects, the cloud-based computing devices 64 have controllers 29 which store and execute various applications 48, including artificial intelligence (AI) and/or machine-learning (ML) parking models for the vehicle 12, as well as telematics communications systems for the vehicle 12, data storage servers 65, vehicle-to-anything (V2X) communications applications or networks 67, and the like. In several aspects, the AI and/or ML models may include statistical ML models, prediction modeling, data driven models that predict categorical values, deep neural networks (DNNs), and may be processed within or executed by a deep learning (DL) module within the controller 29, or similar.

Figure 3:
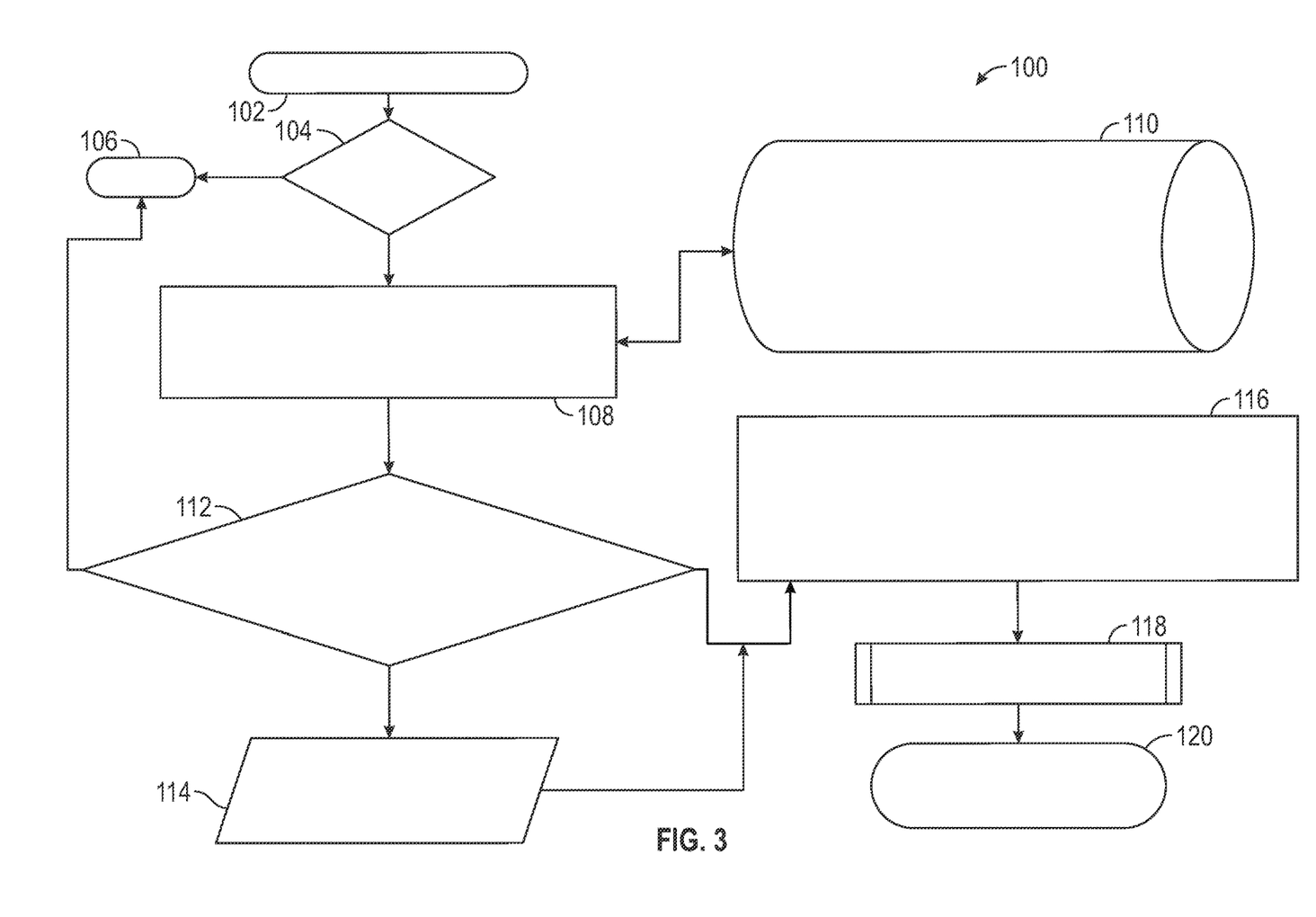
FIG. 3 is a flowchart depicting a method of executing smart parking recommendation control logic for energy conservation according to an exemplary embodiment.

Referring now to FIG. 3 and with continuing reference to FIGS. 1 and 2, the SPRA 52 is shown in further detail. As vehicles 12 are driven by vehicle operators 45, the vehicles 12 convert potential energy stored in fuel and/or batteries of the vehicle 12 into motion and into thermal energy which may be distributed to various vehicle 12 thermal management system components and/or to the passenger compartment of the vehicle 12. In further instances, the thermal energy may be rejected to or otherwise leak to the atmosphere surrounding the vehicle 12. It is an object of the present disclosure that in order to increase the efficiency of the vehicle 12, as little potential energy may be converted into the generation of thermal energy in the vehicle 12 as possible, and therefore, a reduction in passenger compartment thermal energy usage may be achieved. That is, the system 10 and SPRA 52 decrease energy consumption of the vehicle 12 from a first level to a second level less than the first level by utilizing vehicle 12 position within a parking location 16 to optimize solar exposure and wind 26 exposure to reduce reliance upon the vehicle 12 HVAC system to maintain thermal qualities of the vehicle 12 passenger compartment. Additionally, the system 10 described herein provides an effective way of maintaining optimal thermal qualities of the vehicle 12 batteries, especially in electric vehicles (EVs), hybrid-electric vehicles (HEVs), and the like. In several aspects, the system 10 or method 100 of the SPRA 52 may be described as a series of steps beginning at block 102.

At block 104, the SPRA 52 determines whether one or more enabling conditions has been met. The enabling conditions may be any of a variety of different inputs to the system 10 without departing from the scope or intent of the present disclosure. In a non-limiting example, the system 10 and SPRA 52 may present a prompt to the vehicle operator 45 upon the one or more HMIs 54. The prompt may include a Boolean operator, or another such true/false or logic gate display, such as "enable" and/or "disable", or "engage" or "disengage", or the like. In some non-limiting examples, the system 10, and method 100 of the SPRA 52 operates as in an opt-out manner. That is, the SPRA 52 operates in an "engaged" or "enabled" manner by default when the vehicle 12 is on, active, or otherwise in operation, and the vehicle operator 45 can select to "disable" or "disengage" the system 10 should they so desire. When the vehicle operator 45 elects to "disable" or "disengage" the SPRA 52, the system 10 proceeds to block 106 and enters a standby mode.

However, when the SPRA 52 is enabled, either by default, or when the vehicle operator 45 selects "enable" via the HMI 42, the method 100 of the SPRA 52 enables hardware sensing via the sensors 14 of the vehicle 12 and via data acquired from remote sources, such as the cellular towers 62, remote computing resources such as cloud-based computing devices 64, and the like. Subsequently, at block 108, the method 100 of the SPRA 52 monitors the vehicle 12, by obtaining information from the sensors 14 and actuators 50, and monitors the vehicle operator's 45 utilization of the vehicle 12 to determine typical or known parking duration at each location to which the vehicle 12 is driven. The typical parking durations are then categorized for each location as, for example: "Home", "Work", or other such known locations.

At block 110, upon arrival at a known parking location 16, the method 100 of the SPRA 52 causes the vehicle's 12 controller 14 to communicate with external data repositories stored in the cloud-based computing devices 64 to obtain data about the known parking location 16. A known parking location 16 may be defined as a parking location 16 that the vehicle 12 has previously visited, and/or a parking location 16 for which other vehicles 12 communicating with the cloud-based computing devices 64 have visited and uploaded sensor 14 data, and/or a parking location 16 for which infrastructure-based sensors 14 have uploaded data to the cloud-based computing devices 64, and/or parking locations 16 for which high-definition map (HD map) data and/or GPS satellite 60 data is available. The known parking location 16 data may include a quantity of parking spots 20, shade 24 information based on time-of-day, geographical location season, weather information, and parking spot 20 availability. In addition, the SPRA 52 reviews onboard data to determine physical location within the known parking location 16, as well as camera data, HVAC temperature information, and user preferences for passenger compartment thermal quality. In several aspects, the user preferences for passenger compartment thermal quality may include predefined or variable temperatures, HVAC system fan speeds, humidity levels, particulate matter levels, and the like.

At block 112, when the vehicle 12 is determined not to be at a classified location such as "Home" or "Work", the method 100 of the SPRA 52 proceeds to block 106 and enters standby mode once more. However, when at block 112, the vehicle 12 is determined to be located at a classified location, the SPRA 52 determines whether a parking map does or does not exist for the vehicle's 12 current classified location.

When a parking map does not exist, the method 100 of the SPRA 52 proceeds to block 114, where a subroutine or control logic of the SPRA 52 presents a request to the vehicle operator 45 via the HMI 54. In several aspects, the request indicates to the vehicle operator 45 that a parking map does not exist, and that the vehicle 12 should be driven through, around, or within the parking location 16, or to otherwise tour the parking location 16, so that the sensors 14 of the vehicle 12 may scan the parking location 16 and so that the SPRA 52 may utilize data from the sensors 14 in combination with GPS information and the like to learn the parking location 16 and to generate a new parking map of the previously unknown parking location 16. In several aspects, the parking location 16 tour may ascertain information such as parking location 16 size, a quantity of time between parking location 16 entry and selection of and parking within a parking spot 20, a current vehicle 12 battery or fuel level, or the like.

Once the learning process is complete, the SPRA 52 may indicate, via a prompt or notification on the HMI 54, that the learning process is complete, and the method 100 of the SPRA 52 proceeds to block 116.

When a parking map does exist at block 112, the method 100 of the SPRA 52 proceeds directly to block 116, where a subroutine or control logic of the SPRA 52 is executed to determine a suggested parking spot 20. In several aspects, the control logic or subroutine of the SPRA 52 includes an AI or ML model that, based on potential parking spot 20 shade 24 characteristics, minimizes HVAC system loads depending on vehicle 12 time of usage, and the like. The AI or ML model may utilize a variety of data as inputs to determine an idealized parking spot 20, including but not limited to: known parking map information, historical and current vehicle 12 usage behavior, HVAC system data, vehicle operator 45 preferences, camera inputs, and the like.

From block 116, the method 100 of the SPRA 52 proceeds to block 118, where the parking location 16 and a parking spot 20 recommendation are packaged and sent to the HMI 54. At block 120, the parking spot 20 recommendation is presented to the vehicle operator 45, via the HMI 54. In several aspects, the parking spot 20 recommendation may include one or more parking spots 20 within the parking location 16 that satisfy historical and current vehicle 12 usage behavior, HVAC system data, vehicle operator 45 preferences, and the like. Furthermore, at block 120, the method 100 ends. The method 100 may run continuously, iteratively, automatically, or may be manually or periodically run upon the occurrence of a vehicle 12 or a vehicle operator 45 request.

Figure 4:
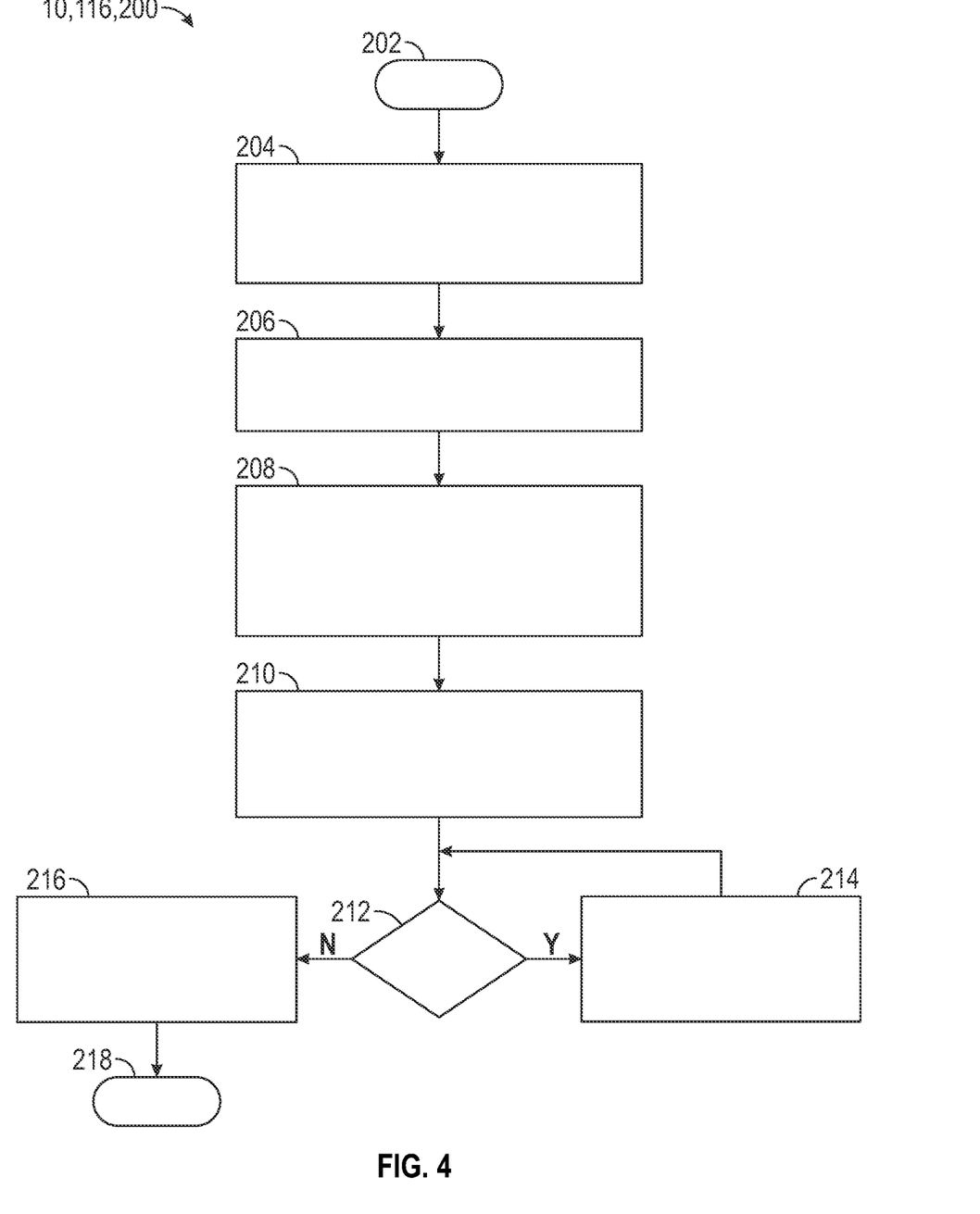
FIG. 4 is a flowchart of a sun location and projected sun shadow path determination subroutine portion of the method of executing smart parking recommendation control logic for energy conservation according to an exemplary embodiment.

Turning now to FIG. 4 and with continuing reference to FIGS. 1-3, as a part of the parking spot 20 recommendation suggestion performed by the SPRA 52 at block 116, the SPRA 52 determines a sun 22 location and projected sun shadow path 25 relevant to the parking location 16. The sun 22 location and projected sun shadow path 25 determination subroutine or control logic is shown in FIG. 4 as a series of method 200 steps beginning at block 202. At block 204, the sun 22 location and sun shadow path 25 subroutine determines a sun 22 position at the time of vehicle 12 arrival at the known parking location 16, as well as determining a projected time of departure based on prior visits to the known parking location 16 and from celestial models. At block 206, the sun shadow path 25 is then derived from a known path of the sun 22 and three-dimensional map data relating to infrastructure and structures, such as the building 18, trees (not specifically shown), terrain models, and the like. From block 206, the method 200 proceeds to block 208 where the sun 22 location and sun shadow path 25 subroutine determines a solar exposure profile for all available parking spots 20 throughout the duration of the parking stay based on parking spot 20 location within the parking location 16 and the sun shadow path 25. At block 210, the sun 22 location and sun shadow path 25 subroutine determines a total solar exposure time for each parking spot 20 throughout the parking stay from the solar exposure profiles of each of the available parking spots 20. The method 200 then proceeds to block 212 where the SPRA 52 determines whether or not there is a desire to relocate the vehicle 12. More specifically, at block 212 the method 200 determines whether the vehicle 12 is currently located at, within, or proximate to one or more of the suggested parking spots 20. More specifically, at block 212, the method 200 determines whether there is a desire to relocate the vehicle 12 based at least in part upon solar exposure metrics.

From block 212, when there is a desire to relocate, the method 200 proceeds to block 214, and the sun 22 location and sun shadow path 25 subroutine of the SPRA 52 selects a parking spot 20 with a greatest or least amount of current solar exposure as may be desired based on the user preferences for passenger compartment thermal quality, including the predefined or variable temperatures, HVAC system fan speeds, humidity levels, particulate matter levels, and the like. When there is a desire to relocate, the sun 22 location and sun shadow path 25 subroutine of the SPRA 52 provides instructions to the one or more HMIs 54 regarding a location of a suggested parking spot 20, and or navigation instructions for the vehicle operator 45 to follow to park within one of the suggested parking spots 20. In some examples, where the vehicle 12 is a fully or partially autonomously-operated, or driven vehicle 12, the SPRA 52 instructs the various actuators 50 of the vehicle to motivate, steer, or otherwise navigate the vehicle 12 into one of the suggested parking spots 20.

In the alternative, when there is no desire to relocate, the method 200 proceeds to block 216 and the sun 22 location and sun shadow path 25 subroutine of the SPRA 52 selects a parking spot 20 with a greatest or least amount of total solar exposure time as may be desired based on the user preferences for passenger compartment thermal quality, including predefined or variable temperatures, HVAC system fan speeds, humidity levels, particulate matter levels, and the like. From block 216, the method 200 proceeds to block 218 where the method 200 ends. It will be appreciated that the method 200 operates while the SPRA 52 is in operation, and may run continuously, iteratively, and/or periodically depending on the particular implementation of the system 10 of the present disclosure, the hardware of the vehicle 12, the availability of autonomous or semi-autonomous features within the vehicle 12, and the like.

In further aspects, the SPRA 52 may take additional non-solar thermal factors into account when determining a preferred parking spot 20. For example, in some situations, the wind 26 may blow against the building 18, a tree, across a hill or the like, and a wind shadow 28 may result behind the building 18, tree, or hill, relative to the direction of the wind 26. Such a wind shadow 28 may reduce a quantity of thermal energy lost or otherwise rejected to the environment of the vehicle 12. Accordingly, the SPRA 52 may utilize wind 26 direction, and wind shadow 28 location (i.e. a wind 26 exposure profile), as well as sun 22 location, sun shadow or shade 24 location and sun shadow path 25 determinations (i.e. a sun 22 exposure profile) in selecting a parking spot 20 that will provide the desired passenger compartment thermal qualities with a lowest possible energy consumption. In several aspects, the SPRA 52 includes control logic that operates similarly to the sun 22 location and sun shadow path 25 subroutine for other environmental factors that may alter thermal energy usage of the vehicle 12, and fuses the results of the various environmental factor subroutines together to provide a best possible parking spot 20 selection for satisfying user preferences for passenger compartment thermal quality.

Figure 5:
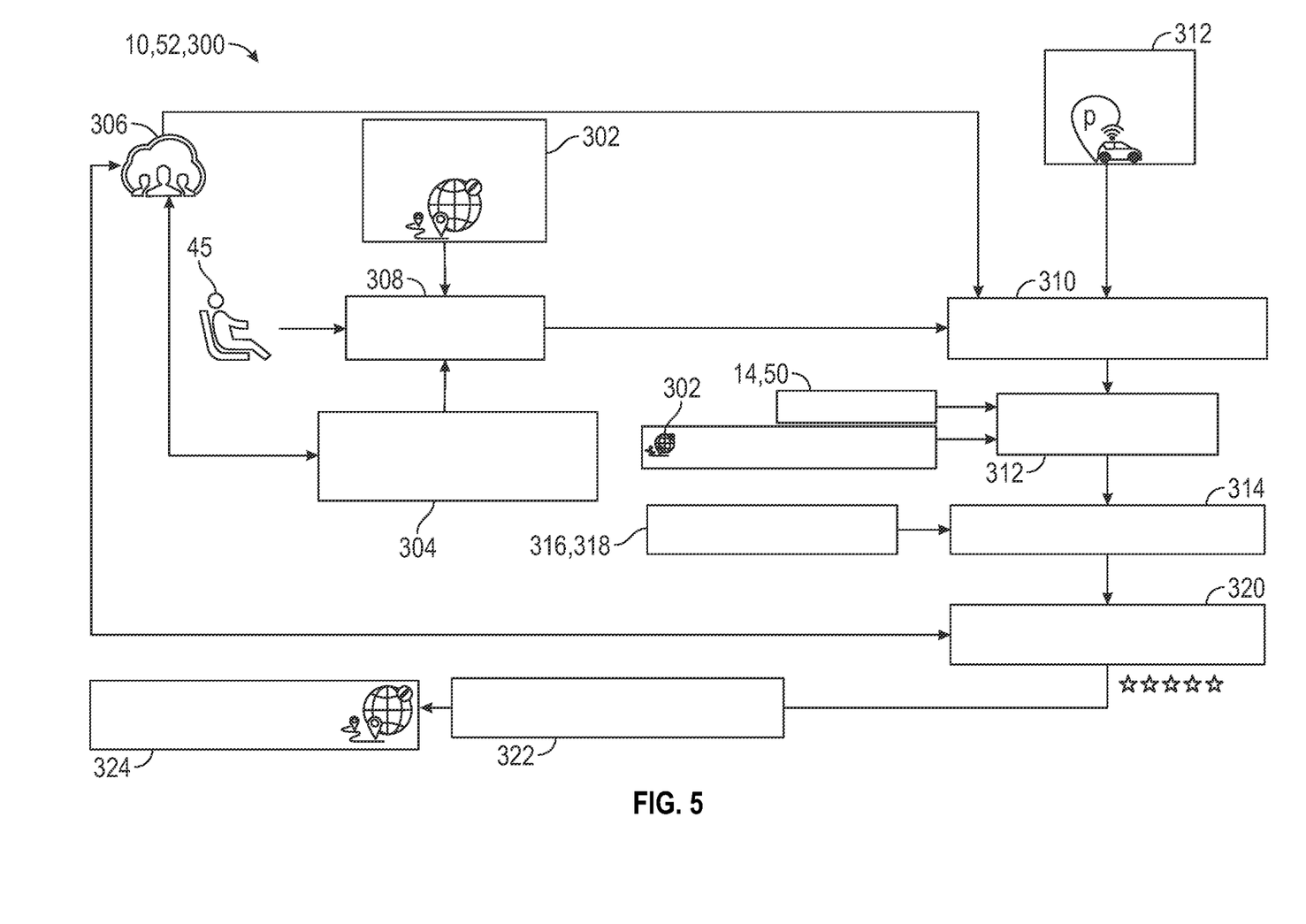
FIG. 5 is a flowchart depicting a thermal comfort-driven parking spot in-vehicle recommendation subroutine portion of the method of executing smart parking recommendation control logic for energy conservation according to an exemplary embodiment.

Turning now to FIG. 5 and with continuing reference to FIGS. 1-4, a view of thermal comfort-driven parking spot 20 in-vehicle 12 recommendation aspect of the SPRA 52 is shown in further detail in flowchart 300 form. In several aspects, the system 10 and SPRA 52 of the present disclosure may be presented on or within one or more of the HMIs 54, including within a mobile application or mobile app 57 on a cellular phone 58, or the like. The SPRA 52 utilizes data from a vehicle operator 45, from one or more location intelligence APIs 302, and from historical records 304 of similar trips in the past during a predetermined window of time. The historical records 304 may include a duration and frequency of similar trips, and the like. The historical records 304 are uploaded to one or more of the cloud-based computing devices 64, and used to generate a personalized cloud profile 306 for each vehicle operator 45 utilizing the vehicle 12. The cloud profile 306 may further include an origin, a destination, a search geofence and personal preferences of the vehicle operator 45.

The SPRA 52 then makes a trip purpose inference 308 that assists in determining a length of time that the vehicle 12 will be parked. For example, the trip purpose inference 308 may include, but is not limited to, determining that the trip is a commute to work, to school, to home, running errands, taking an excursion, or that the vehicle 12 is involved in the transportation of others. In addition, the trip purpose inference 308 includes an expected parking duration at a given parking location 16. From the trip purpose inference 308, and the personalized cloud profile 306, the SPRA 52 searches for nearby parking spots 20 at block 310. In several aspects, the parking spot 20 search at block 310 also utilizes data from parking APIs at block 312 to determine the current availability of public and/or shared parking options near the vehicle operator's 45 destination.

Once available parking spots 20 have been ascertained at block 310, the SPRA 52 proceeds to block 312 where vehicle 12 thermal comfort predictions are calculated from vehicle 12 signals from the sensors 14 and actuators 50 and the location intelligence APIs 302. In several aspects, the thermal comfort predictions at block 312 utilize data from a variety of vehicle 12 sensors 14. In several aspects, the data from the sensors 14 may include a sunload calculation, passenger compartment air temperature, interior dashboard temperature, interior roof temperature, humidity, and ambient temperature around the vehicle 12. Further sensor 14 data may include information about the status of various components of the vehicle 12, such as: a blower mode of the HVAC system, an air conditioning status (i.e. on/off), an air inlet mode (i.e. recirculation, or exterior-sourced), a sunroof position status, a window position status for the driver window and/or for the passenger window and/or for other windows of the vehicle 12. In addition to the sensor 14 data, user-defined or estimated parking durations are used as inputs to the thermal comfort prediction. Likewise, information from location intelligence APIs 302, including sun 22 location, sun shadow or shade 24 location and sun shadow path 25 profiles, as well as a location heat map that may include information about the parking location's 16 current and projected future thermal profile. The thermal comfort prediction subroutine at block 312 then generates a thermoception/alliesthesia estimation that indicates an estimated vehicle operator 45 thermal pleasure or comfort in a ranked manner. In several aspects, the ranked thermal comfort prediction subroutine 312 may output a ranking for each possible parking spot 20 at the parking location 16 that includes one of: "very comfortable", "comfortable", "just comfortable", "just uncomfortable", "uncomfortable", and "very uncomfortable."

Subsequently, at block 314, the SPRA 52 engages a parking spot recommendation subroutine or control logic that solves a constrained optimization problem that compares available parking spot 20 options to constraints. In several aspects, the constrained optimization problem utilizes a series of inputs to determine the optimum parking spot 20 to recommend. A first input is a design vector that includes a set of unknowns or decision variables such as a recommended parking spot 20 and parking direction. The information used to determine the design vector may include a vehicle 12 location, a parking location 16, a set of parking location 16 operating hours (i.e. a closing time), a parking location 16 hourly rate or other such costs, parking location 16 accessibility concerns (i.e. wheelchair accessibility and the like), a parking location 16 type such as street parking or underground structure parking, EV charging availability, estimated time of arrival (ETA) to the parking location 16, walking distance from the parking location 16 to the vehicle operator's 45 destination, and a predicted thermal comfort score.

A second input to the constrained optimization problem may include an objective function to be maximized, such as maximizing vehicle operator 45 thermal comfort within the vehicle 12 passenger compartment.

Finally a third input to the constrained optimization problem includes hard constraints 316 and soft constraints 318. Hard constraints 316 include physical parameters, such as proximity to destination, duration of parking allowed at the parking location 16, accessibility needs, if any, whether the vehicle 12 will physically fit the parking location 16 and parking spots 20 therein, and a parking fee or hourly rate. Soft constraints 318 may include any of a wide variety of "soft" characteristics, such as vehicle operator 45 preferences. Such soft constraints may include preferred parking location 16 types (street/underground), a parking location 16 safety score, a crowd-sourced parking location 16 score, a street parking fine score, and familiarity. Familiarity includes information about whether the parking location 16 was previously used by the same vehicle 12 and/or vehicle operator 45.

Subsequently, the SPRA 52 determines a best fit parking spot 20 optimized for vehicle operator 45 thermal comfort preferences, subject to the soft and hard constraints. A derivative-free constrained optimization application 48 subroutine of the SPRA 52 then generates a ranked list of recommended parking spots 20. In several examples, the ranked list of recommended parking spots 20 may take into account current and predicted weather, sun 22 position, wind 26 direction, and the like, as well as vehicle 12 orientation relative to the sun 22 and wind 26. That is, depending on vehicle operator 45 thermal preferences, the vehicle 12 may be desired to park facing forward towards the sun 22 in cold weather, to ensure that the greatest amount of solar thermal energy is retained by the vehicle 12 passenger compartment, and vice versa when the weather is hot. Similarly, the vehicle's 12 orientation may be selected to preserve vehicle 12 hardware and component longevity, such as preserving leather, painted, and plastic surfaces of the passenger compartment by minimizing ultraviolet (UV) light exposure, or the like. The ranked list of recommended parking spots 20 may be manually or automatically selected by the vehicle operator 45 and/or the vehicle 12 itself at block 320. Once one of the ranked parking spots 20 is selected, the SPRA 52 presents, via the one or more HMIs 54 a navigation path to the selected one of the ranked parking spots 20. In autonomous or semi-autonomous vehicle 12 examples, the vehicle 12 may navigate automatically or semi-automatically to the selected one of the ranked parking spots 20 and park therein. In further aspects, the SPRA 52 may engage various actuators 50 of the vehicle 12 to open or close windows of the vehicle 12 to thermally regulate the vehicle 12 passenger compartment in the most energy-efficient manner available, subject to the hard and soft constraints 316, 318, and weather (i.e. the windows shall remain substantially closed when it is raining or snowing and the vehicle 12 is parked in an outdoor parking location 16).

Once the vehicle 12 has been parked within the selected one of the ranked parking spots 20, the SPRA 52 scores the parking spot 20 and/or prompts the vehicle operator 45 to score the parking spot 20. The parking spot 20 score may include a variety of information, including to what degree the hard and soft constraints 316, 318 have been met, and to what degree the vehicle operator's 45 preferences have been satisfied. The parking spot 20 score is then uploaded or updated at block 322 to a crowdsourced HD Map 324, as well as to the personalized cloud profile 306 for the vehicle operator 45. Upon initiation of the SPRA 52 for a subsequent trip to the same parking location 16, the SPRA 52 then retrieves user preferences based on the crowdsourced HD map 324 and the personalized cloud profile 306, including the parking spot 20 score, to generate a weighted parking spot 20 recommendation that is implemented in the parking spot 20 ranking step in the future.

It should be appreciated that the system 10 and methods 100, 200, 300 of the present disclosure may be portable and/or adaptable to various different vehicles 12 having distinct hardware configurations. For example, the system 10 and methods 100, 200, 300 may be retrofitted to preexisting vehicles 12 without autonomous functionality, or may be accessed via a vehicle operator's 45 mobile device 58 as a mobile app 57 or other software as a service (Saas) arrangement, such that a vehicle operator 45 may use the system 10 and methods 100, 200, 300 with a bicycle, a motorcycle, or other such vehicle 12 lacking a traditional passenger compartment.

A smart parking recommendation system 10 and method 100 for energy conservation of the present disclosure offers several advantages. These include, maximizing vehicle 12 passenger compartment thermal quality and comfort for vehicle operators 45 while taking advantage of the physical location of the vehicle 12 relative to sun 22, wind 26, buildings 18, and other infrastructure in the vehicle's 12 surrounding environment to improve vehicle 12 energy consumption efficiency without relying upon new vehicle 12 hardware or componentry, and while offering a portable, retrofittable solution that efficiently maintains or improves vehicle 12 range.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A smart parking recommendation system for energy conservation in a vehicle, comprising:
    a vehicle;
    one or more sensors equipped to the vehicle and collecting static and dynamic information about the vehicle, and an environment surrounding the vehicle;
    one or more actuators disposed on the vehicle and actively and continuously adjusting the state of the vehicle;
    a controller having a processor, a memory, and one or more input/output (I/O) ports, the I/O ports communicating with the one or more sensors and the one or more actuators, the processor executing programmatic control logic stored in the memory, the programmatic control logic including a smart parking recommendation application (SPRA), the SPRA application comprising:
    a first control logic for determining that one or more enabling conditions have been met;
    a second control logic that, obtains from the one or more sensors and from the one or more actuators, static and dynamic information about the vehicle and the environment surrounding the vehicle;
    a third control logic that monitors, via the one or more sensors, and from information obtained from remote computing resources via the I/O ports, a vehicle operator's current usage of the vehicle and determines a typical parking duration for a current parking location;
    a fourth control logic that categorizes the current parking location;
    a fifth control logic that utilizes an artificial intelligence (AI) or machine learning (ML) model to suggest a parking spot within the current parking location that satisfies vehicle passenger compartment thermal quality user preferences and energy consumption preferences given a set of soft constraints and hard constraints;
    a sixth control logic that displays parking spot options to the vehicle operator via a human-machine interface (HMI); and
    a seventh control logic that selectively parks or guides the vehicle to be parked within a parking spot that satisfies the soft constraints, the hard constraints, the vehicle passenger compartment thermal quality user preferences, and minimizes energy consumption for maintaining thermal qualities of the vehicle passenger compartment, and thermal qualities of vehicle batteries.

2. The system of claim 1, wherein the first control logic further comprises:
    control logic for automatically engaging the SPRA by default; or
    control logic for receiving, from the vehicle operator via the HMI, an input that causes the SPRA to manually engage; and
    upon automatically engaging the SPRA or receiving a vehicle operator input that causes the SPRA to manually engage, determining that the enabling conditions have been met and enabling the SPRA.

3. The system of claim 1, wherein the third control logic further comprises:
    control logic that monitors, via the one or more sensors and the one or more actuators of the vehicle, vehicle static and dynamic information and information about the environment surrounding the vehicle; and
    control logic that obtains, from the remote computing resources, current and historical information about the environment surrounding the vehicle, and information about known parking locations relevant to the vehicle.

4. The system of claim 1, wherein the fourth control logic further comprises:
    control logic that determines known parking durations at each location to which the vehicle is driven; and
    control logic that categorizes the current parking location according to known historical parking durations at the current parking location by the vehicle and the vehicle operator.

5. The system of claim 4, wherein the fourth control logic further comprises:
    control logic that obtains, from the remote computing resources, known parking location information including: a quantity of parking spots within the known parking location; shade information based on time-of-day, season, weather information, geographical location, and parking spot availability; and control logic that determines a current physical location of the vehicle within the current parking location is available and satisfies vehicle passenger compartment thermal quality user preferences and energy consumption preferences given a set of soft constraints and hard constraints, wherein the soft constraints comprise: vehicle operator preferences, a vehicle operator preferred parking location, a vehicle operator preferred parking safety score, a crowd-sourced parking location score, a street parking fine score, and vehicle operator familiarity with the current parking location, and wherein the hard constraints comprise: vehicle proximity to destination, vehicle physical size compared to parking lot physical constraints, duration of parking allowed at the parking location, vehicle operator accessibility needs, a parking fee, and a parking hourly rate.

6. The system of claim 4, wherein the fifth control logic further comprises:

control logic that determines whether a parking map for the current parking location exists; and upon determining that a parking map does not exist, executing control logic that prompts the vehicle operator or prompts the vehicle to tour the current parking location and utilize the sensors and actuators to scan the current parking location and combine global positioning system (GPS) information obtained via communications through the I/O ports to develop a new parking map for the current parking location.

7. The system of claim 6, wherein the fifth control logic further comprises:

control logic that, upon determining that a parking map does exist, or that a new parking map exists, utilizes one or more of AI and ML models to determine which parking spots of a plurality of parking spots within the parking map or new parking map satisfy vehicle passenger compartment thermal preferences and energy consumption preferences, given the soft constraints and the hard constraints.

8. The system of claim 7, wherein the fifth control logic further comprises:

control logic that generates a thermal comfort prediction for each of the parking spots that satisfy vehicle passenger compartment thermal preferences and energy consumption preferences, given the soft constraints and the hard constraints; and control logic that ranks the parking spots based on the thermal comfort prediction and the energy consumption preferences.

9. The system of claim 8, wherein the sixth control logic further comprises:

control logic that presents to the vehicle operator, via the HMI, a ranked list of recommended parking spots based on the thermal comfort prediction and the energy consumption preferences for each of the parking spots that satisfy the vehicle passenger compartment thermal preferences and energy consumption preferences, given the soft constraints and the hard constraints.

10. The system of claim 9, wherein the seventh control logic further comprises:

control logic that causes one or more of the vehicle and the vehicle operator to select one of the recommended parking spots, and guiding the vehicle operator to park the vehicle within the selected one of the recommended parking spots or guiding the vehicle to drive automatically to park within the selected one of the recommended parking spots.

11. The system of claim 1, wherein the seventh control logic further comprises:

control logic that decreases energy consumption of the vehicle from a first level to a second level less than the first level by utilizing vehicle position within the parking location to optimize a solar exposure profile and a wind exposure profile to reduce reliance upon a vehicle heating, ventilation and air conditioning (HVAC) system to maintain the thermal qualities of the vehicle passenger compartment and vehicle batteries.

12. A smart parking recommendation method for energy conservation in a vehicle, comprising:

collecting, with a plurality of sensors disposed on a vehicle, real-time information about a dynamic state of the vehicle and an environment surrounding the vehicle;

actively and continuously adjusting a dynamic state of the vehicle with a plurality of actuators disposed on the vehicle;

executing programmatic control logic including a smart parking recommendation application (SPRA) stored in memory of a controller of the vehicle, the controller having a processor, a memory, and one or more input/output (I/O) ports, the I/O ports communicating with the plurality of sensors and the plurality of actuators, the SPRA application comprising:

determining that one or more enabling conditions have been met;

obtaining from the plurality of sensors and from the plurality of actuators, static and dynamic information about the vehicle and the environment surrounding the vehicle;

monitoring, via the plurality of sensors, and from information obtained from remote computing resources via the I/O ports, a vehicle operator's current usage of the vehicle and determines a typical parking duration for a current parking location;

categorizing the current parking location;

utilizing an artificial intelligence (AI) or machine learning (ML) model to suggest a parking spot within the current parking location that satisfies vehicle passenger compartment thermal quality user preferences and energy consumption preferences given a set of soft constraints and hard constraints;

displaying parking spot options to the vehicle operator via a human-machine interface (HMI); and selectively parking or guiding the vehicle to be parked within a parking spot that satisfies the soft constraints, the hard constraints, the vehicle passenger compartment thermal quality user preferences, and decreasing energy consumption of the vehicle from a first level to a second level less than the first level by utilizing vehicle position within the parking location to optimize a solar exposure profile and a wind exposure profile to reduce reliance upon a vehicle heating, ventilation and air conditioning (HVAC) system to maintain the thermal qualities of the vehicle passenger compartment and vehicle batteries.

13. The method of claim 12, further comprising:

automatically engaging the SPRA by default; or receiving, from the vehicle operator via the HMI, an input that causes the SPRA to manually engage; and engaging the SPRA or receiving a vehicle operator input that causes the SPRA to manually engage, determining that the enabling conditions have been met and enabling the SPRA.

14. The method of claim 12, further comprising:
monitoring, via the plurality of sensors and the plurality of actuators of the vehicle, vehicle static and dynamic information and information about the environment surrounding the vehicle; and
obtaining, from the remote computing resources, current and historical information about the environment surrounding the vehicle, and information about known parking locations relevant to the vehicle.

15. The method of claim 12, further comprising:
determining known parking durations at each location to which the vehicle is driven; and
categorizing the current parking location according to known historical parking durations at the current location by the vehicle and the vehicle operator.

16. The method of claim 15, further comprising:
obtaining, from the remote computing resources, known parking location information including: a quantity of parking spots within the known parking location; shade information based on time-of-day, season, weather information, geographical location, and parking spot availability;
determining a current physical location of the vehicle within the current parking location is available and satisfies vehicle passenger compartment thermal quality user preferences and energy consumption preferences given a set of soft constraints and hard constraints, wherein the soft constraints comprise: vehicle operator preferences, a vehicle operator preferred parking location, a vehicle operator preferred parking safety score, a crowd-sourced parking location score, a street parking fine score, and vehicle operator familiarity with the current parking location, and wherein the hard constraints comprise: vehicle proximity to destination, vehicle physical size compared to parking lot physical constraints, duration of parking allowed at the parking location, vehicle operator accessibility needs, a parking fee, and a parking hourly rate;
determining whether a parking map for the current parking location exists; and
upon determining that a parking map does not exist, executing control logic that prompts the vehicle operator or prompts the vehicle to tour the current parking location and utilize the sensors and actuators to scan the current parking location and combine global positioning system (GPS) information obtained via communications through the I/O ports to develop a new parking map for the current parking location.

17. The method of claim 16, further comprising:
upon determining that a parking map does exist, or that a new parking map exists, utilizes one or more of AI and ML models to determine which parking spots of a plurality of parking spots within the parking map or new parking map satisfy vehicle passenger compartment thermal preferences and energy consumption preferences, given the soft constraints and the hard constraints.

18. The method of claim 17, further comprising:
generating a thermal comfort prediction for each of the parking spots that satisfy vehicle passenger compartment thermal preferences and energy consumption preferences, given the soft constraints and the hard constraints;
ranking the parking spots based on the thermal comfort prediction and the energy consumption preferences; and
presenting to the vehicle operator, via the HMI, a ranked list of recommended parking spots based on the thermal comfort prediction and the energy consumption preferences for each of the parking spots that satisfy the vehicle passenger compartment thermal preferences and energy consumption preferences, given the soft constraints and the hard constraints.

19. The method of claim 18, further comprising:
causing one or more of the vehicle and the vehicle operator to select one of the recommended parking spots, and guiding the vehicle operator to park the vehicle within the selected one of the recommended parking spots or guiding the vehicle to drive automatically to park within the selected one of the recommended parking spots.

20. A smart parking recommendation method for energy conservation in a vehicle, comprising:
collecting, with one or more sensors disposed on a vehicle, real-time information about a dynamic state of the vehicle and an environment surrounding the vehicle;
actively and continuously adjusting a dynamic state of the vehicle with one or more actuators disposed on the vehicle;
executing programmatic control logic including a smart parking recommendation application (SPRA) stored in memory of a controller of the vehicle, the controller having a processor, a memory, and one or more input/output (I/O) ports, the I/O ports communicating with the one or more sensors and the one or more actuators, the SPRA application comprising:
automatically engaging the SPRA by default, or receiving, from a vehicle operator via a human-machine interface (HMI), an input that causes the SPRA to manually engage;
engaging the SPRA or receiving a vehicle operator input that causes the SPRA to manually engage, determining that enabling conditions have been met and enabling the SPRA;
obtaining from the one or more sensors and from the one or more actuators, static and dynamic information about the vehicle and the environment surrounding the vehicle;
monitoring, via the one or more sensors, and from information obtained from remote computing resources via the I/O ports, a vehicle operator's current usage of the vehicle and obtaining, from the remote computing resources, current and historical information about the environment surrounding the vehicle, and information about known parking locations relevant to the vehicle; and determining a typical parking duration for a current parking location;
determining known parking durations at each location to which the vehicle is driven;
categorizing the current parking location according to known historical parking durations at the current location by the vehicle and the vehicle operator;
obtaining, from the remote computing resources, known parking location information including: a quantity of parking spots within the known parking location; shade information based on time-of-day, season, weather information, geographical location, and parking spot availability;
determining a current physical location of the vehicle within the current parking location is available and satisfies vehicle passenger compartment thermal quality user preferences and energy consumption preferences given a set of soft constraints and hard constraints, wherein the soft constraints comprise: vehicle operator preferences, a vehicle operator preferred parking location, a vehicle operator preferred parking safety score, a crowd-sourced parking location score, a street parking fine score, and vehicle operator familiarity with the current parking location, and wherein the hard constraints comprise: vehicle proximity to destination, vehicle physical size compared to parking lot physical constraints, duration of parking allowed at the parking location, vehicle operator accessibility needs, a parking fee, and a parking hourly rate;

determining whether a parking map for the current parking location exists; and upon determining that a parking map does not exist, executing control logic that prompts the vehicle operator or prompts the vehicle to tour the current parking location and utilize the one or more sensors and the one or more actuators to scan the current parking location and combine global positioning system (GPS) information obtained via communications through the I/O ports to develop a new parking map for the current parking location; and   control logic that, upon determining that a parking map does exist, or that a new parking map exists, utilizes one or more of AI and ML models to determine which parking spots of a plurality of parking spots within the parking map or new parking map satisfy vehicle passenger compartment thermal preferences and energy consumption preferences, given the soft constraints and the hard constraints;

utilizing an artificial intelligence (AI) or machine learning (ML) model to suggest a parking spot within the current parking location that satisfies vehicle passenger compartment thermal quality user preferences and energy consumption preferences given a set of soft constraints and hard constraints, including: generating a thermal comfort prediction for each of the parking spots that satisfy vehicle passenger compartment thermal preferences and energy consumption preferences, given the soft constraints and the hard constraints;

ranking the parking spots based on the thermal comfort prediction and the energy consumption preferences;

presenting to the vehicle operator, via the HMI, a ranked list of recommended parking spots based on the thermal comfort prediction and the energy consumption preferences for each of the parking spots that satisfy the vehicle passenger compartment thermal preferences and energy consumption preferences, given the soft constraints and the hard constraints; and   causing one or more of the vehicle and the vehicle operator to select one of the recommended parking spots, and selectively parking or guiding the vehicle to be parked within a parking spot that satisfies the soft constraints, the hard constraints, the vehicle passenger compartment thermal quality user preferences, and decreasing energy consumption of the vehicle from a first level to a second level less than the first level by utilizing vehicle position within the parking location to optimize a solar exposure profile and a wind exposure profile to reduce reliance upon a vehicle heating, ventilation and air conditioning (HVAC) system to maintain the thermal qualities of the vehicle passenger compartment and vehicle batteries.

\* \* \* \* \*